United States Patent
Lanter et al.

(10) Patent No.: US 6,830,771 B2
(45) Date of Patent: Dec. 14, 2004

(54) FIBER-CONTAINING ANIMAL FEED GEL

(75) Inventors: Kent J. Lanter, Waterloo, IL (US); Mark E. Griffin, Pacific, MO (US); Dorrance G. Haught, Union, MO (US)

(73) Assignee: Purina Mills, LLC, St. Louis, MO (US)

( * ) Notice: Subject to any disclaimer, the term of this patent is extended or adjusted under 35 U.S.C. 154(b) by 272 days.

(21) Appl. No.: 10/072,199

(22) Filed: Feb. 7, 2002

(65) Prior Publication Data

US 2003/0147992 A1 Aug. 7, 2003

(51) Int. Cl.$^7$ .............................................. A23L 1/053
(52) U.S. Cl. .................. 426/573; 426/576; 426/72; 426/74; 426/623; 426/635; 426/807; 426/805
(58) Field of Search ................................ 426/573, 576, 426/72, 74, 623, 635, 805, 807

(56) References Cited

U.S. PATENT DOCUMENTS

| | | | |
|---|---|---|---|
| 5,217,740 A | 6/1993 | Lanter | 426/573 |
| 5,525,353 A | 6/1996 | Fajt | 424/442 |
| 6,171,632 B1 | 1/2001 | Lanter et al. | 426/573 |

FOREIGN PATENT DOCUMENTS

| | | | |
|---|---|---|---|
| LU | 87756 | 6/1990 | |
| WO | 98/47392 | 10/1998 | A23L/1/0532 |

OTHER PUBLICATIONS

Sheaffer, C.C., et al., *Acid Detergent Fiber, Neutral Detergent Fiber Concentration, and Relative Feed Value*, pp. 1–3, http://www.naaic.org/stdtests/acidfiber.htm.

NFTA, FAP—Two Stet TDM Determination of Wet Samples, pp. 1–5, http://foragestesting.org/fap/twostep.html.

*Primary Examiner*—C. Sayala
(74) *Attorney, Agent, or Firm*—Whyte Hirschboeck Dudek SC

(57) ABSTRACT

A firm, flexible feed gel that provides animals, especially non-human primates such as orangutans, with fiber. The gel comprises a gelling agent, added-fiber, and water. While nutritional foods consumed by animals, both natural and manufactured, can contain certain amounts of fiber, the amount of fiber can be insufficient in maintaining the health of the animal. The invention provides a firm, flexible gel that contains an amount of fiber that is over and above the amount of fiber normally found in the animal's nutritional foods, i.e., it provides added-fiber. A method of preparing the gel comprises: (i) providing a gelling agent, a source of added-fiber, and water; (ii) blending the gelling agent and the added-fiber to form a mixture; (iii) combining the water and the mixture to form a homogeneous mass; (iv) transferring the homogeneous mass into a mold; and (v) cooling the homogeneous mass to form the firm, flexible feed gel. The gel can be frozen in one or more molds, stabilized, and/or reduced to a powder (which can later be rehydrated).

11 Claims, No Drawings

FIBER-CONTAINING ANIMAL FEED GEL

FIELD OF THE INVENTION

This invention relates in general to a non-human animal feed gel and, more particularly, to animal feed gels containing fiber, having good palatability for a variety of animals such as orangutans and other non-human primates. In another aspect, the invention relates to animal feed gels containing high levels, e.g., 15 weight percent or more based on the weight of the gel, of fiber.

BACKGROUND OF THE INVENTION

The many and varied zoological gardens of the world are responsible for the breeding and care of a wide assortment of animals. The feeding of these animals is a major expense in the operation of these gardens, and it can often prove to be a logistical challenge. Depending upon the type, size and number of animals, insuring that each receives a properly balanced diet in a timely and efficient manner requires careful planning, reliable food sources, trained personnel and, not infrequently, good fortune.

In an effort to diminish the problems associated with the feeding of such animals, the operators of these gardens and similar establishments, e.g., breeding farms, entertainment facilities, etc., continuously search for manufactured feeds to replace natural feeds. Manufactured feeds are generally less expensive, available in bulk quantities, generally easier to transport and store, less fungible, and often easier to tailor with respect to nutritional content than natural feeds.

Fiber is an important part of a properly balanced diet for many animals. While some sources of fiber may have some nutritional value for some animals, the primary function of fiber is as a digestive aid. Fiber adds bulk to the stool; it hastens passage of fecal material through the digestive tract; and it promotes regular bowel movements. Moreover, food stuffs containing relatively high or large amounts of fiber, e.g., 15 weight percent or more, are typically bulky with a low caloric content. Such foods will often sate the appetite of the animal, and thus make it less likely to overeat.

As here used, fiber is a plant product, typically at least one of cellulose, hemicellulose, pectin, gum, mucilage and lignin. It is either water-soluble or water-insoluble, and the amount of it in any given food stuff can be measured by any one of a number of well known methods (e.g., acid detergent fiber, neutral detergent fiber, amylase-neutral detergent fiber, etc.). The method of choice for purposes of this invention is neutral detergent fiber, and it is determined according to the procedure of Goering, H. K. and Van Soest, P. J., 1970, Forage Fiber Analysis, Agricultural Handbook No. 379, Agricultural Research Service, U.S. Department of Agriculture, Washington, D.C.

Introducing sufficient fiber into the diet of a kept animal can be problematic. Simply providing the animal with a manufactured, high fiber food product is not enough; the animal must be induced to eat it. Typically, animals find high fiber products unpalatable because the products are dry, e.g., contain less than about 10 weight percent water. The products are dry because, among other reasons, the products are usually made by extrusion or pelletization. Moreover, such dry products are often prone to crumbling during transportation and/or feeding, and many such products lack adequate palatability.

To resolve these problems, at least partially if not fully, the manufactured high fiber food products should mimic the natural foods of the target animal. This requires, among other things, a sufficient moisture level and familiar taste and texture.

SUMMARY OF THE INVENTION

The gel products of this invention are prepared from a gelling agent, an added-fiber source, and water. Preferably, the animal feed gels further comprise a palatability agent such as honey, bananas, natural and artificial flavorings, and natural and artificial sweeteners. Optionally, the animal feed gels comprise nutritionally valuable ingredients such as proteins, oils, fats, vitamins, minerals, antioxidants, and the like.

The natural foods consumed by animals often inherently contain certain amounts of fiber. However, the amounts of such fiber in these foods can be insufficient in maintaining the desired health of the animal. Therefore, the invention provides a manufactured feed, in the form of a firm, flexible gel, that contains "added-fiber", i.e., fiber over and above that present in the gel that is attributable to other gel components. In other words, "added-fiber" means fiber that derives from a gel component whose principal purpose in the gel is to provide a source of fiber to the animal, as opposed to fiber that derives from a gel component whose principal purpose is to provide another function, e.g., a gum to set the gel, or a fruit to enhance the palatability of the gel, etc. For example, in a gel of this invention comprising a gum, banana (as a palatability agent), water and ground corn cobs, the added-fiber is that derived from the ground corn cobs since each of the other ingredients serve a different primary purpose. In some gels, virtually all, if not all, of the fiber present is added-fiber, e.g., a gel comprising water, gum, ground corn cobs and an artificial sweetener.

In one aspect, the invention provides a firm, flexible, high fiber feed gel for animals. The gel comprises, by weight percent based upon the weight of the gel, between about 0.3 and about 18 percent of a gelling agent, at least about 15 percent neutral detergent fiber at 75 percent moisture content (which corresponds to about 20 percent neutral detergent fiber on a 100 percent dry matter basis), and water. "At 75 percent moisture content" means that the neutral detergent fiber content of the gel is measured on a gel comprising 75 weight percent water. If the gel comprises a different percentage of water (more or less), then for purposes of this invention the fiber and/or added-fiber content of the gel is measured using the standard neutral detergent technique and that measurement is subsequently adjusted to a 75 weight percent water basis. Sources of fiber include both natural and manufactured foods. Optional ingredients include one or more palatability agents, proteins, starches, vitamins, minerals, fats and oils, and the like.

In another aspect, the invention provides a method of preparing a firm, flexible feed gel. Specifically, the method comprises: (i) providing a gelling agent, a source of added-fiber, and water; (ii) blending the gelling agent and added-fiber to form a mixture; (iii) combining the water and the mixture to form a homogeneous mass; (iv) transferring the homogeneous mass into a mold; and (v) cooling the homogeneous mass to form the firm, flexible feed gel.

The method can further comprise grinding the added-fiber source, enriching the gel by adding vitamins and/or minerals, and pouring the homogeneous mass into molds prior to cooling. The molds generally comprise cardboard boxes each lined with a plastic bag. Also, the method can comprise heating the water or mixture to aid the gelling agent in dissolving and the homogenous mass to help set the gel. In some embodiments, the gel is frozen in a single solid block or frozen after being poured into single-serving size molds. Further, the method can comprise stabilizing the gel. Stabilizing is defined as inhibiting microbial growth by adding a preservative to the gel.

In one embodiment of the invention, the method includes reducing the gel to a powder using any conventional dehydration technology. When ready for use, the powder is mixed with sufficient water (i.e., rehydrated) under appropriate conditions to form a firm, flexible gel.

Despite the above acts being outlined in a step-by-step sequence, the completion of the steps in a particular sequential order is not mandatory. For example, the gelling agent can be dissolved in water prior to the addition of the added-fiber source.

Gels that comprise about 15 or more percent by weight of neutral detergent fiber, based on the weight of the gel measured at 75 percent moisture content, are, for purposes of this invention, "high fiber" gels. This corresponds to about 20 weight percent neutral detergent fiber on a 100 percent dry matter basis.

DETAILED DESCRIPTION OF THE PREFERRED EMBODIMENT

The animal feed gel of this invention is intended as a replacement for, or a supplement to, a natural food product. The gel is also intended as a replacement for other manufactured food products, typically produced by extrusion or pelletization, currently used in feeding programs for various non-human primates, e.g., great apes, lesser apes, monkeys, lemurs, marmosets and the like. The gel is particularly suited for use with several of the great apes including orangutans, gorillas, and chimpanzees.

Gelling Agent

Any edible material (i.e., any material that can be consumed by the target animal without detriment to its health) that will assist in the formation of a colloid in which the disperse phase (e.g., added-fiber) combines with the continuous phase (e.g., water) to produce a firm, flexible product (e.g., a semi-solid product with the consistency similar to that of a hot dog or finger gelatin) can be used as the gelling agent in the practice of this invention. The typical and preferred gelling agents are gelatins and gums, and these can be used alone or in combination with one another (e.g., one gelatin, one gum, two or more gelatins, two or more gums, one or more gelatins in combination with one or more gums, etc.). In one embodiment, the gelling agent comprises one or more gelatins in combination with one or more gums.

Generally any source of gelatin can be used as the gelling agent in the practice of this invention. Beyond any nutritional value, the purpose of the gelatin is to provide structural strength to the finished product. In one preferred embodiment, heat-set gelatins are the gelling agent of choice. Similarly, any gum can be used as the gelling agent in the practice of this invention. Gum is of minimal nutritional value, but the gum will lend to the structural integrity of the final product. Moreover, gums assist the setting process, e.g., they impede the separation of feed ingredients during the setting process. Typical gums include alginate, arabic, agar, carboxymethyl cellulose, carrageenan, gelan, kauri, locust bean, tragacanth and xanthan. In one preferred embodiment, the gum comprises TICAGEL 550 manufactured by TIC Gums, Inc., of Belcamp, Md. TICAGEL 550 is a blend of carageenan and locust bean.

The maximum amount of gum in the final product can vary to convenience, but typically it does not exceed about 5, preferably it does not exceed about 4 and more preferably it does not exceed about 2, weight percent.

The maximum amount of gelatin in the final product can also vary to convenience, but typically it does not exceed about 20, preferably it does not exceed about 16 and more preferably it does not exceed about 10, weight percent. If used in combination with a gum, then the amount of gelatin used in the final product is typically at least about 20, preferably at least about 16 and more preferably at least about 10, weight percent based on weight of the product. Where the gelatin and the gum are used in combination, the gum is used for water control or to inhibit and/or prevent settling until the animal feed gel has cured.

Added-Fiber

Any source of added-fiber, natural or manufactured, can be used in the practice of this invention. Corn cobs, soy hulls, powdered cellulose, aspen chips or other wood fibers, beet pulp, and the like, are typical natural fiber sources. In one preferred embodiment, Grit-o'-cob brand #4060 corn cobs from Anderson Cob Mills, Inc., of Maumee, Ohio, are used as the added-fiber source.

Primate browse biscuits are a representative manufactured source of added-fiber. Primate browse biscuits are biscuit or briquette-shaped nutritional foods or supplements for primates containing elevated or enhanced levels of fiber with respect to the natural foods that a primate usually consumes. In one embodiment, MAZURI brand 5MA4 primate browse biscuits manufactured by Purina Mills of St. Louis, Mo., are used. The 5MA4 primate browse biscuits comprise dehulled soybean meal, corn flour, dried beet pulp, corn gluten meal, sucrose, ground aspen, powdered cellulose, dried apple pomace, fructose, calcium carbonate, soybean oil, sodium hexametaphosphate, dicalcium phosphate, potassium chloride, brewers dried yeast, salt, orange flavoring, L-lysine, pyridoxine hydrochloride, L-ascorbyl-2-polyphosphate (source of vitamin C), choline chloride, taurine, iron polysaccharide complex, menadione dimethylpyrimidinol bisulfite (source of vitamin K), DL-methionine, folic acid, d-alpha tocopheryl acetate (source of natural vitamin E), cholecalciferol (source of vitamin $D_3$), calcium pantothenate, beta carotene, biotin, magnesium oxide, vitamin A acetate, ethoxyquin (a preservative), thiamin mononitrate, cyanocobalamin (source of vitamin $B_{12}$), riboflavin, nicotinic acid, cobalt polysaccharide complex, copper polysaccharide complex, manganese polysaccharide complex, zinc polysaccharide complex, ethylenediamine dihydriodide, and sodium selenite.

Foods or food products that inherently contain fiber can serve as the added-fiber source. These foods include oat bran, oatmeal, beans, peas, rice bran, barley, citrus fruits, strawberries and apple pulp, whole-wheat breads, wheat cereals, wheat bran, rye, rice, barley, most other grains, cabbage, beets, carrots, Brussels sprouts, turnips, cauliflower and apple skin. Using these sources of added-fiber provides the additional benefits of providing the animal with other nutrients essential to its health, e.g., vitamins, minerals, etc., but the amount of fiber in these foods tend to be less than that found in such materials as corn cobs, soy hulls and the like.

The above sources of added-fiber are well known and commercially available. Depending upon the balance desired, two or more such sources can be, and often are, used in combination. Other sources of added-fiber can also be used to produce the animal feed gel of this invention, the above-listed not intended to be exhaustive.

The total amount of neutral detergent added-fiber in the gel, regardless of source, is at least about 5, preferably at least about 12, and more preferably about 15, weight percent based upon the weight of the gel at 75 percent moisture content. If the gel is a high fiber gel, then the total amount of neutral detergent fiber in the gel, regardless of its source and regardless if it is all added-fiber or only about 5 weight percent added-fiber with the remainder fiber attributable to other gel ingredients, is at least about 15, preferably at least about 18, and more preferably at least about 20, weight percent based upon the weight of the gel at 75 percent moisture content.

Water

Water comprises the balance of the food product and generally commands a majority (or at least a significant plurality, e.g., about forty percent) of the food product. Since added-fiber sources often have a low moisture content, known animal feed products containing such fiber are often very dry, especially if produced by pelleting or extrusion. Therefore, without sufficient amounts of water, it is difficult for feed products to resist crumbling or breaking during such activities as product transportation and animal feeding. Thus, the moisture content of animal feed products, and especially high fiber animal feed products, can be important. Generally, the amount of water in the high fiber feed gel of the present invention is at least about 50, preferably at least about 60 and more preferably at least about 75, percent of the total weight of the animal feed gel. Besides assisting in keeping the animal feed product in a firm, flexible state, the high moisture content helps mimic the natural foods that the animals, e.g., non-human primates, would normally eat.

Palatability Agent

Since many animals, particularly primates, can be extremely finicky eaters, high fiber products generally possess poor palatability for these animals. To assist in overcoming this obstacle, the high fiber gel of this invention, optionally and preferably, includes a palatability agent. The palatability agent itself can comprise one or more additives to encourage or entice consumption of the high fiber gel by appealing to one of the animal's senses such as taste, smell, touch, and the like. Palatability agents include ingredients such as honey, bananas, natural and artificial flavorings, and natural and artificial sweeteners.

In one preferred embodiment, NUTRASWEET brand artificial sweetener manufactured by The NutraSweet Company, Inc., of Deerfield, Ill., is added as a component of the gel for use as a palatability agent. In another preferred embodiment, the palatability agent comprises orange flavor T3332 or cherry flavor 005705 manufactured by St. Louis Flavors, Inc., ofFenton, Mo.

Nutrients/Miscellaneous Ingredients

Depending upon desired nutritional value, the final gel product can contain various nutritional additives such as animal protein (e.g., meat meals, poultry meals, blood meals, feather meals, fish meals, etc.), plant protein (e.g., soybean meal, soy protein concentrate, canola meal, cotton seed meal, sunflower meal, etc.), starch (e.g., corn and wheat flour, barley, oats, sorghum, tapioca, their milled components, etc.), vitamins (e.g., vitamins A, the various B vitamins, C, D, E, etc.), minerals (e.g., potassium chloride, salt, zinc oxide, etc.), amino acids (e.g., d,1-methionine, thiamin, 1-tryptophan, etc.) and the like.

The gel can also comprise at least one oil or fat. The oils and fats include liquid and soluble materials that are not inherently present in any other nonfat sources that may be present in the final food product. The oils and fats include both animal fat, e.g., beef tallow, bleachable fancy tallow, choice white grease, yellow grease, and the like; vegetable oil, e.g., soybean oil, palm oil, cottonseed oil, sunflower oil, corn oil, canola oil and the like; and combinations of a variety of these.

The amount of oil or fat in the food product is dependent, at least in part, on whether or not the animal feed formulation is designed for either low or high fat content. If designed for a low fat content, then typically the amount of oil or fat in the feed is at least about 0.25, preferably at least about 0.5 and more preferably at least about 1, weight percent based on the weight of the shaped animal feed. In these low fat formulations, the maximum amount of oil or fat in the animal feed typically does not exceed about 2.5, preferably does not exceed about 2 and more preferably does not exceed about 1.5, weight percent. If designed for a high fat content, then typically the amount of oil or fat in the feed is at least about 2.5, preferably at least about 3 and more preferably at least about 4, weight percent based on the weight of the animal feed. In these high fat formulations, the maximum amount of oil or fat in the animal feed typically does not exceed about 15, preferably does not exceed about 8 and more preferably does not exceed about 6, weight percent.

In some embodiments, a pigment, an appetite stimulant, a therapeutic agent, a medicinal ingredient, an animal appearance-enhancing ingredient, and/or a preservative can be added to the gel.

The above-listed nutrients and/or miscellaneous ingredients can be referred to as optional ingredients and are generally present in minor amounts relative to the other ingredients, such as the added fiber and water.

Also, despite headings, e.g., Gelling Agent, Fiber, etc., being inserted above to assist the reader, these headings should not be construed to limit those materials described below the particular heading to a particular class. For example, a material listed beneath the heading "Palatability Agent" can provide a source of "Fiber", and vise versa.

Method of Preparing the Gel

The typical preparation of the gel begins by providing a gelling agent, an added-fiber source, and water. The gelling agent is blended with the fiber as well as any optional ingredients, such as a palatability agent and/or a nutrients/miscellaneous ingredient, to form a mixture. Thereafter, the water is added to the mixture to form a homogeneous mass. The homogeneous mass is then transferred into a mold and cooled to form the firm, flexible gel.

In one embodiment, a first portion of water and a volume of bananas are blended together until the bananas are liquefied. Thereafter, the liquefied bananas (as a palatability agent), added-fiber, any optional ingredients, such as one or more additional palatability agents and/or a nutrients/miscellaneous ingredients, and the second portion of the water are blended together to form a mixture. In this embodiment, a WARING brand blender available through the Dynamics Corporation of America from Greenwich, Conn., can perform blending.

The added-fiber described in the above methods can be supplied by one of the illustrative fiber sources listed above, or a combination of two or more of those sources. Likewise, the palatability agent and the nutrients/miscellaneous ingredients can be one of the illustrative palatability agents and nutrients/miscellaneous ingredients listed above, or a combination of two or more of those sources.

In those situations where the added-fiber source is bulky or coarse, as with corn cobs or browse biscuits, grinding of the added-fiber source may be appropriate. As such, a volume of the added-fiber source can be ground using commercial grinding equipment. In one preferred embodiment, a FITZ MILL brand grinding mill manufactured by The Fitzpatrick Company of Elmhurst, Ill., fitted with a number four screen having 0.0625 (4/64) inch diameter apertures, is enlisted to perform the grinding.

In some embodiments, the homogeneous mass can be heated for the purpose of pasteurization. In these embodiments, the water can be heated to a temperature of at least about 120, preferably at least about 150, and more preferably at least about 180, degrees Fahrenheit and that temperature sustained for at least about 5, preferably at least about 8, and more preferably at least about 10, minutes.

Also, while forming the homogeneous mass during the combining step, one or more nutritionally valuable ingredients such as animal proteins, plant proteins, oils, fats, vitamins, minerals, antioxidants, and the like can be added. Furthermore, one or more pigments, appetite stimulants, therapeutic agents, medicinal ingredients, animal appearance enhancing ingredients, and preservatives can also be added. In one preferred embodiment, the assembled ingredients can be combined using a GROEN brand five-gallon, twin action, steam kettle manufactured by Dover Corporation of Elk Grove Village, Ill. In another preferred embodiment, the ingredients can be combined using a MYERS brand 550A-20-20-475 mixer/disperse available from Myers Engineering, Inc., of Bell, Calif. In this embodiment, the disperser is operated at 2,010 RPM's (4,730 ft/min tip speed) and the low speed wiper set at 4, which translates to approximately 88 RPM's. The ingredients are mixed and dispersed until a homogeneous mass is produced.

In some embodiments, the homogenous mass can be heated to a temperature of at least about 160, preferably at least about 170, and more preferably at least about 180, degrees Fahrenheit and that temperature sustained for at least about 6, preferably at least about 8, and more preferably at least about 10, minutes. Besides other things, the act of heating at this point in the method can allow heat-set gels to perform.

In one embodiment, the gel in the mold can be frozen, for example, into single block. The frozen block can be stored, transported, shipped, or the like to a customer. Upon reaching the customer, the customer can keep the block frozen or cooled until it is ready for distribution to the animals. Prior to feeding, the block can be thawed and cut, sliced, shredded, or otherwise disassembled to facilitate feeding to the selected animal as convenient.

In one preferred embodiment, the mold comprises a plurality of individual molds, for example, plastic lined, cardboard boxes 8 inches long, 8 inches wide, and 9 inches tall (8" by 8" by 9"). Again, at this point, the gels can be directly shipped to the customer in the individual molds or the gels can be frozen and then shipped to the customer. If the gels are frozen, as before, the gels can be thawed and cut, sliced, shredded, or otherwise disassembled to facilitate feeding to the selected animal, as convenient.

In still another embodiment, the gel is stabilized or protected against microbial growth. Various preservatives such as fumaric acid, propionic acid, and citric acid can be included in the animal feed as well as other antibacterial and antifungal compounds which include known preservatives such as calcium chloride, potassium sorbate, sodium sorbate, and other sorbate salts and sorbic acid. The stabilized gel can then be packaged and shipped directly to the customer.

Further, the gel can be dehydrated or otherwise transformed into a powder prior to packaging and shipping. Thereafter, the customer can add water to the powder or otherwise rehydrate the powder to reproduce the gel.

Generally, the firm, flexible feed gel comprises, by weight percent based upon the weight of the gel, components in the ranges illustrated and reported in Table I below.

TABLE I

| Component | Broad Range | Preferred Range | Most Preferred Range |
|---|---|---|---|
| Added-Fiber Content* | 5–15* | 10–15* | 11.8–15* |
| Gelling Agents | 0.3–18 | 1–13 | 1.5–10 |
| Water | 30–90 | 50–85 | 70–80 |
| Palatability Agent | 0–25 | 1–15 | 2–10 |
| Nutrients/Misc. | 0–10 | 1–8 | 2–6 |

*The given percentages comprise a neutral detergent added-fiber on an "as-is" basis. On a 100 percent dry matter basis, the percentages would comprise about 20–60 for the Broad Range, about 40–60 for the Preferred Range, and about 47–60 for the Most Preferred Range.

In some specific embodiments, as illustrated by Tables II, III, IV, V and VI, the following ingredients were used in percentage by weight based on the weight of the gel.

Four firm, flexible animal feed gel samples, A–D, were prepared consistent with the ingredients and proportions appearing in Table II:

TABLE II

|  | A | B | C | D |
|---|---|---|---|---|
| Soy Hulls | 0 | 7.82 | 0 | 0 |
| Corn Cobs | 0 | 0 | 6.33 | 18 |
| 5MA4 Biscuits | 10 | 0 | 0 | 0 |
| Ticagel 550 | 2 | 2 | 2 | 1.68 |
| Xanthan | 0 | 0.2 | 0 | 0 |
| Water | 73 | 72.85 | 73 | 70.61 |
| Bananas | 10 | 9.98 | 10 | 10 |
| Honey | 5 | 4.99 | 5 | 5 |
| Vit./Min. mix | 0 | 2.16 | 0 | 0 |
| Vit./Min. mix | 0 | 0 | 3.67 | 0 |

For each of Samples A–D in Table II, the Ticagel 550 was blended with all of the ingredients, except the bananas and the water, to form a first mixture. In the preparation of Sample A, the selected added-fiber source was 5MA4 Browse biscuits. These biscuits were ground using the FITZ MILL brand mill fitted with a number four screen. Sample B relied on soy hulls as an added-fiber source and included the Xanthan, while Samples C and D used Grit-o'-cob brand #4060 corn cobs as an added-fiber source. The bananas were liquefied, using a portion of the water and a WARING brand blender, to form a second mixture.

In each of Samples A–D, the first mixture, the second mixture, and the remaining portion of water were combined together in a 5 gallon GROEN brand twin action steam kettle. The ingredients in the kettle were blended together and heated to a temperature of 185 degrees Fahrenheit, the temperature being sustained for 10 minutes. This produced a homogeneous mass that was poured into plastic lined 8"×8"×9" cardboard boxes. Upon allowing the homogenous masses to cool, the firm flexible feed gel was formed. All of the gels looked good and possessed a good viscosity. The gels in the cardboard boxes were frozen and sent to the St. Louis Zoo for testing with orangutans.

One firm, flexible animal feed gel sample, A, was prepared consistent with the ingredients and proportions appearing in Table III:

TABLE III

| | A |
|---|---|
| Corn Cobs | 12.6 |
| Ticagel 550 | 2.1 |
| Water | 69 |
| Bananas | 11 |
| Honey | 5.3 |

For Sample A in Table III, the Ticagel 550 was blended with all of the ingredients, except the bananas and the water, to form a first mixture. In the preparation of Sample A, the selected added-fiber source was Grit-o'-cob brand #4060 corn cobs. The bananas were liquefied, using a portion of the water and a WARING brand blender, to form a second mixture.

The first mixture, the second mixture, and the remaining portion of the water were combined together in a 5 gallon GROEN brand twin action steam kettle. The ingredients in the kettle were blended together and heated to a temperature of 185 degrees Fahrenheit, the temperature being sustained for 10 minutes. This produced a homogeneous mass that was poured into plastic lined 8"×8"×9" cardboard boxes. Upon allowing the homogenous masses to cool, the firm flexible feed gel was formed. All of the gels looked good and possessed a good viscosity. The gels in the cardboard boxes were frozen and sent to the St. Louis Zoo for testing with orangutans.

Eight firm, flexible animal feed gel sub-samples, A-1, A-2, B-1, B-2, C-1, C-2, D-1, and D-2, were prepared consistent with the ingredients and proportions appearing in Tables IV and V:

TABLE IV

| | A-1 | A-2 | B-1 | B-2 |
|---|---|---|---|---|
| Soy Hulls | 47* | 47* | 0 | 0 |
| Corn Cobs | 0 | 0 | 50* | 50* |
| Ticagel 550 | 2.25 | 2.25 | 2.25 | 2.25 |
| Water | 70 | 70 | 70 | 70 |
| NutraSweet | 0.2 | 0.4 | 0.2 | 0.4 |
| Orange Flavor | 0.5 | 0.5 | 0.25 | 0.25 |
| Cherry Flavor | 0 | 0 | 0 | 0 |

*Represents percentage of neutral detergent added-fiber on a 100 percent dry matter basis.

TABLE V

| | C-1 | C-2 | D-1 | D-2 |
|---|---|---|---|---|
| Soy Hulls | 0 | 0 | 0 | 0 |
| Corn Cobs | 60* | 60* | 60* | 60* |
| Ticagel 550 | 2.25 | 2.25 | 2.25 | 2.25 |
| Water | 70 | 70 | 70 | 70 |
| NutraSweet | 0.2 | 0.4 | 0.2 | 0.4 |
| Orange Flavor | 0.25 | 0.25 | 0 | 0 |
| Cherry Flavor | 0 | 0 | 2.0 | 2.0 |

*Represents percentage of neutral detergent added-fiber on a 100 percent dry matter basis.

For each of the sub-samples in Tables IV and V, a Sample A, B, C, and D was prepared and then divided to form the eight firm flexible feed gels A-1, A-2, etc.

Samples A, B, C, and D were each produced by blending the Ticagel 550 with all of the ingredients, except water, to form a first mixture. In the preparation of Sample A, the selected added-fiber source was soy hulls. In the preparation of Samples B, C, and D, the selected added-fiber source was Grit-o'-cob brand #4060 corn cobs. In Samples A, B, and C, the Orange Flavor T33332 was an ingredient and, in Sample D, the Cherry Flavor 005705 was an ingredient. NutraSweet brand sweetener was an ingredient in Samples A, B, C, and D.

Thereafter, the first mixture and the water were combined together in a 5 gallon GROEN brand twin action steam kettle. The ingredients in the kettle were blended together and heated to a temperature of 185 degrees Fahrenheit, the temperature being sustained for 10 minutes. This produced a homogeneous mass.

Half of the homogeneous mass was removed from the blender and poured into plastic lined 8"×8"×9" cardboard boxes. These homogeneous masses were labeled with a "-1". Upon allowing the homogenous masses to cool, the firm flexible feed gel was formed from A-1, B-1, C-1, and D-1. All of the gels looked good and possessed a good viscosity.

The other half of the homogeneous mass remaining in the blender received a further quantity of NutraSweet brand sweetener. The homogeneous mass was then further blended and poured into plastic lined 8"×8"×9" cardboard boxes. These homogeneous masses were labeled with a "-2". Upon allowing the homogenous masses to cool, the firm flexible feed gel was formed from A-2, B-2, C-2, and D-2. All of the gels looked good and possessed a good viscosity.

The gels from each half of the samples were frozen in the cardboard boxes and sent to the St. Louis Zoo for testing with orangutans.

Four firm, flexible animal feed gel sub-samples, A, B, C and D, were prepared consistent with the ingredients and proportions appearing in Table VI:

TABLE VI

| | A | B | C | D |
|---|---|---|---|---|
| Soy Hulls | 47* | 0 | 0 | 0 |
| Corn Cobs | 0 | 50* | 60* | 0 |
| 5MA4 Biscuits | 0 | 0 | 0 | 26.5* |
| Ticagel 550 | 1.125 | 1.125 | 1.125 | 1.125 |
| Water | 85 | 85 | 85 | 85 |

*Represents percentage of neutral detergent added-fiber on a 100 percent dry matter basis.

For each of Samples A, B, C, and D in Table VI, the Ticagel 550 was blended with all of the ingredients, except water, to form a first mixture. In the preparation of Sample A, the selected added-fiber source was soy hulls. In the preparation of Samples B and C the selected added-fiber source was Grit-o'-cob brand #4060 corn cobs. In the preparation of Sample D, the selected added-fiber source was 5MA4 Browse biscuits. These biscuits were ground using the FITZ MILL brand mill fitted with a number four screen.

In each of Samples A–D, the first mixture and the water were combined in a MYERS brand 550A-20-20-475 mixer/disperser. The disperser was operated at 2,010 RPMs (4,730 ft/min tip speed), and the low speed wiper was set at 4, which translates to approximately 88 RPM's, such that the ingredients in the disperser were blended. The ingredients were also heated to a temperature of 180 degrees Fahrenheit, the temperature being sustained for 10 minutes, such that pasteurization was accomplished. This produced a homogeneous mass that was poured into a plastic lined, fifteen pound box. Upon allowing the homogenous masses to cool, the firm flexible feed gel was formed. The gels in the fifteen pound boxes were frozen and some of them sent to the St. Louis Zoo for testing with orangutans.

The animal feed gel produced in each instance provided a high fiber, firm, flexible animal feed gel with good palatability and a high moisture content. The process for making the gel avoided extrusion or pellitization.

Although only a few embodiments of the present invention are described above in detail, those skilled in the art will appreciate that many additions and modifications can be made without departing from the spirit and scope of the invention. These and all other modifications are included within the scope of the present invention as described in the following claims.

What is claimed is:

1. A method of preparing a firm, flexible feed gel for non-human primates, the gel comprising by weight percent based upon the weight of the gel:
  A. between about 0.3 and about 18 percent of a gelling agent, wherein the gelling agent is at least one of gelatin, Arabic gum, agar, carboxymethyl cellulose, carrageenan gum, gelan, kauri, locust bean gum, tragacanth gum and xanthan gum;
  B. at least about 5 percent, measured at 75 percent moisture content, of at least one of corn cobs, soy hulls, powdered cellulose, aspen chips, wood chips and beet pulp; and
  C. water; the method comprising:
  providing a gelling agent, the at least one of corn cobs, soy hulls, powdered cellulose, aspen chips, wood chips and beet pulp, and water;
  blending the gelling agent and the at least one of corn cobs, soy hulls, powdered cellulose, aspen chips, wood chips and beet pulp to form a mixture;
  combining the water and the mixture to form a homogeneous mass;
  transferring the homogeneous mass into a mold; and
  cooling the homogeneous mass to form the firm, flexible feed gel.

2. The method of claim 1 in which the method further comprises grinding the at least one of corn cobs, soy hulls, powdered cellulose, aspen chips, wood chips and beet pulp.

3. The method of claim 1 in which the method further comprises providing at least one of protein, oil, fat, vitamin, mineral and antioxidant for inclusion into the homogeneous mass.

4. The method of claim 1 in which the mold comprises a plurality of individual cardboard boxes, each box lined with a plastic bag.

5. The method of claim 1 further comprising heating the water to a temperature of about 180 F and sustaining the temperature for approximately 2 minutes.

6. The method of claim 1 further comprising heating the homogeneous mass to a temperature to about 185 F and sustaining the temperature for approximately 10 minutes.

7. The method of claim 1 further comprising providing a preservative for inclusion into the homogeneous mass.

8. The method of claim 1 further comprising dehydrating the gel into a powder.

9. The method of claim 8 further comprising rehydrating the powder into the gel.

10. A method of providing a non-human primate animal with a neutral detergent fiber containing food, the method comprising feeding to the animal a firm, flexible feed gel comprising:
  A. between about 0.3 and about 18 percent of a gelling agent, wherein the gelling agent is at least one of gelatin, Arabic gum, agar, carboxymethyl cellulose, carrageenan gum, gelan, kauri, locust bean gum, tragacanth gum and xanthan gum;
  B. at least about 5 percent, measured at 75 percent moisture content, of at least one of corn cobs, soy hulls, powdered cellulose, aspen chips, wood chips and beet pulp; and
  C. water.

11. The method of claim 10 in which the animal is a great ape.

* * * * *